United States Patent [19]

Conrad

[11] 4,414,815
[45] Nov. 15, 1983

[54] GAS TURBINE WITH ATOMIZER NOZZLE

[75] Inventor: Oswald Conrad, Fellbach, Fed. Rep. of Germany

[73] Assignee: Daimler-Benz Aktiengesellschaft, Fed. Rep. of Germany

[21] Appl. No.: 172,439

[22] Filed: Jul. 25, 1980

[30] Foreign Application Priority Data

Jul. 25, 1979 [DE] Fed. Rep. of Germany ....... 2930055

[51] Int. Cl.³ .............................................. F02C 7/22
[52] U.S. Cl. ....................................... 60/726; 60/737; 60/751; 415/DIG. 1
[58] Field of Search .............. 60/726, 737, 751, 39.07; 415/207, 211, DIG. 1

[56] References Cited

U.S. PATENT DOCUMENTS

| | | | |
|---|---|---|---|
| 3,362,629 | 1/1968 | Papapanu | 415/207 |
| 4,081,957 | 4/1978 | Cox, Jr. | 60/737 |
| 4,131,389 | 12/1978 | Perrone et al. | 415/DIG. 1 |
| 4,182,117 | 1/1979 | Exley et al. | 60/751 |

FOREIGN PATENT DOCUMENTS 2004024 3/1979 United Kingdom ......... 415/DIG. 1

*Primary Examiner*—Carlton R. Croyle
*Assistant Examiner*—Jeffrey A. Simenauer
*Attorney, Agent, or Firm*—Craig & Burns

[57] ABSTRACT

A gas turbine engine which includes a combustion chamber adapted to be supplied with fuel by at least one atomizer nozzle. The gas turbine engine includes an air compressor for supplying compressed air to the combustion chamber, with the compressor including a secondary guide vane set having a plurality of ducts. At least one of the ducts of the secondary guide vane set is connected to the atomizer nozzle by means of a conduit. The at least one duct is equipped with a boundary layer bleed-off.

4 Claims, 6 Drawing Figures

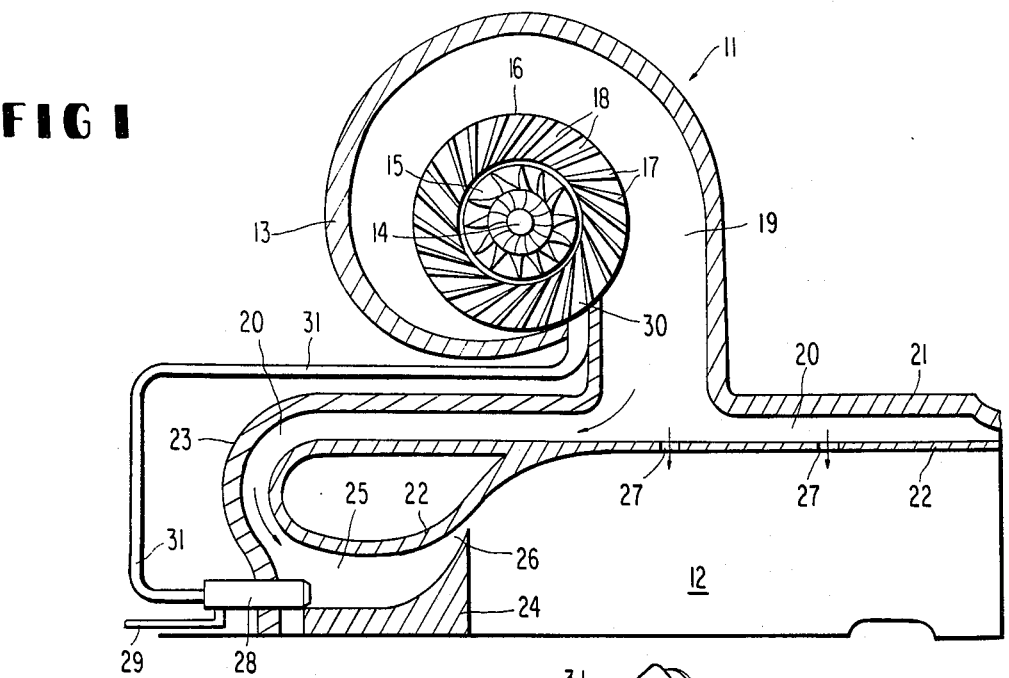
FIG 1
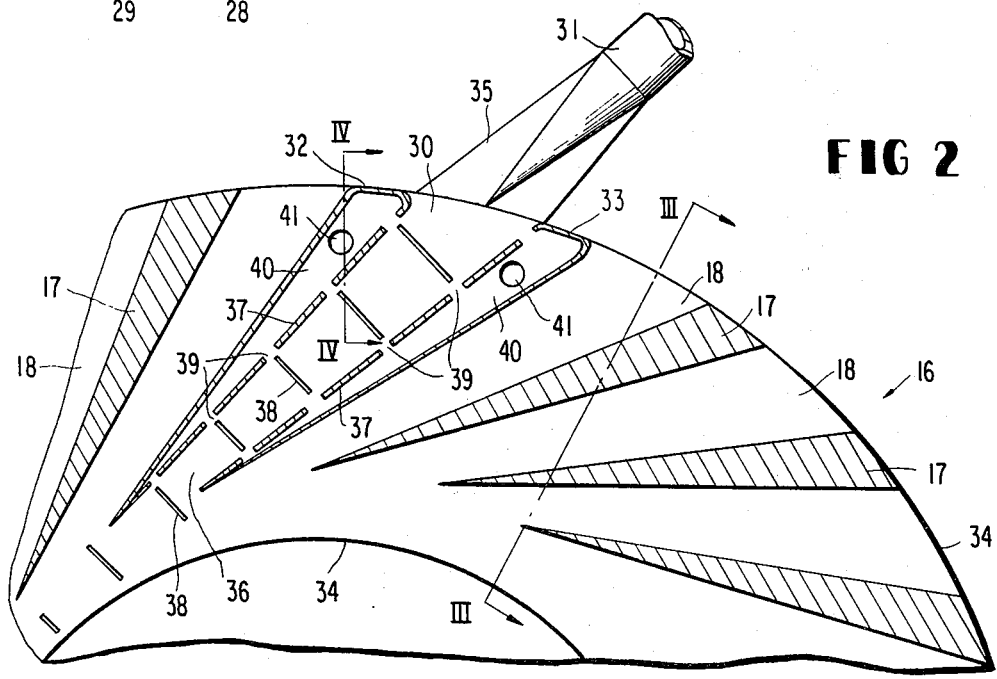
FIG 2
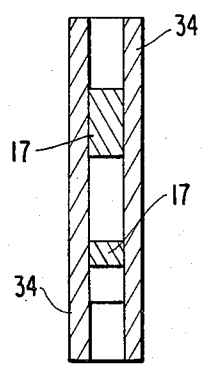
FIG 3
FIG 4

GAS TURBINE WITH ATOMIZER NOZZLE

The present invention relates to a trubine arrangement and, more particularly, to a gas turbine arrangement wherein fuel is fed to a combustion chamber through at least one atomizer nozzle, with air required for the atomizer nozzle being branched off from an outlet of a compressor.

To obtain the air pressure required for a satisfactory atomization of fuel through an atomizer nozzle of a gas turbine engine, customarily, the atomizer air is compressed by an air pump arranged in a connecting conduit interposed between the compressor and the atomizer nozzle. The air pump, which must convey air which is greatly heated up in the compressor, operates only at a low degree of efficiency. Thus, a relatively large and heavy pump is required and such pump needs a large amount of power which must, in turn, be derived from the turbine through a gearing system. A disadvantage of such proposed arrangements reside in the fact that a high thermal load on the pump leads to strong wear and tear of the various parts of the pump. Moreover, the pump requires a considerable amount of space in the accessory chamber of the turbine which chamber is quite restricted in space to begin with.

The aim underlying the present invention essentially resides in providing a means for permitting a generation of a vigorous atomizing air jet for an atomizing nozzle of a gas turbine engine which may be constructed in economical fashion.

In accordance with advantageous features of the present invention, at least one duct of a secondary or follow-up guide vane set of the compressor of the gas turbine is connected with the atomizer nozzle through a conduit, with the duct being provided with a boundary layer bleed-off or suction removal arrangement. By virtue of these features, the air pressure at an outlet of the exhausted duct is raised without withdrawing power from the turbine in a simple and effective way and to such an extent that there is no need for an air pump. Consequently, the above-noted disadvantages and other disadvantages inherent with the use of the air pump are completely eliminated.

Devices for exhausting or bleeding-off of a boundary layer in diffusors of radial flow compressors have been proposed. For example, in Offenlungungsschrift No. 2,740,903, the boundary layer of all ducts is bled off to improve the flow.

In contradistinction to the last mentioned construction, the present invention aims at a simple supply of the atomizer nozzle with air of sufficient pressure, for which purpose only one duct of the secondary guide vane set of the compressor needs to be exhausted.

In accordance with further advantageous features of the present invention, all ducts of the secondary guide vane set of the compressor may be equipped or provided with a boundary layer bleed-off. In this connection, each duct connected to an atomizer nozzle may be provided with a stronger or more intense boundary layer bleed-off than the remaining ducts so that, in this manner, an adequate atomizer air jet may be produced without having to forego the advantages realized by a bleeding-off of all of the ducts.

Advantageously, in accordance with the present invention, the ducts of the secondary guide vane set, each being connected to an atomizer nozzle, exhibit among themselves a differently strong boundary layer bleed-off. Preferably, the intensity of each boundary layer bleed-off of a duct is determined by the number and/or size of the exhaust openings.

Additionally, in accordance with further features of the present invention, the intensity of the boundary layer bleed-off of a duct is determined by a pressure level at a mouth of the exhaust conduit of the duct.

Advantageously, a hollow blade of the secondary guide vane set adjoining two ducts of differently intense boundary layer bleed-off is provided with a partition for subdividing an interior of the blade into two chambers, with each chamber being in communication with the exhaust openings of a duct.

Accordingly, it is an object of the present invention to provide an arrangement for permitting the generation of vigorous atomizer air jets for a gas turbine engine which avoids, by simple means shortcomings and disadvantages encountered in the prior art.

Another object of the present invention resides in providing an arrangement for permitting a generation of a vigorous atomizer air jet for a gas turbine engine which does not require a separate air pump.

Yet another object of the present invention resides in providing an arrangement for permitting a generation of a vigorous atomizing air jet for a gas turbine engine which functions realiably under all operating conditions.

These and other objects, features, and advantages of the present invention will become more apparent from the following description when taken in connection with the accompanying drawings which show, for the purpose of illustration only, several embodiments in accordance with the present invention, and wherein:

FIG. 1 is a partial cross-sectional schematic view of a radial flow compressor and a portion of a combustion chamber of a gas turbine engine in accordance with the present invention;

FIG. 2 is a cross-sectional view, on an enlarged scale, of a diffusor of the radial flow compressor of FIG. 1;

FIG. 3 is a radial cross-sectional view taken along the line III—III in FIG. 2;

FIG. 4 is a radial cross sectional view taken along the line IV—IV in FIG. 2;

Figure 5:
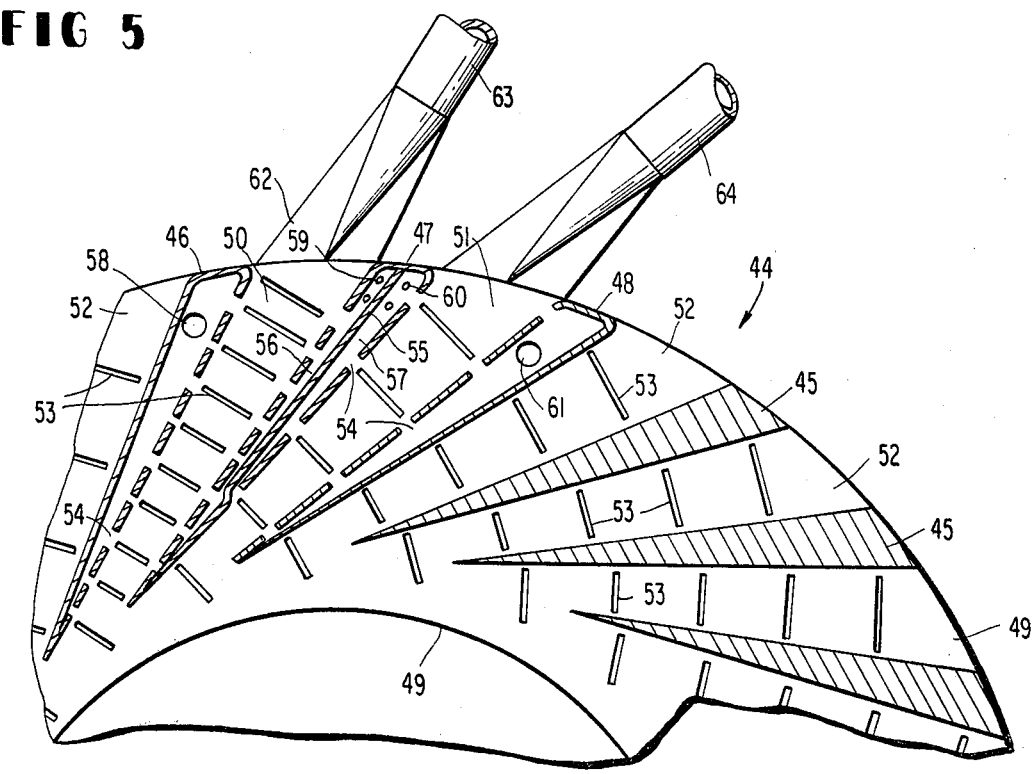
FIG. 5 is a cross-sectional view through a portion of a diffusor of another radial-flow compressor.

Referring now to the drawings wherein like reference numerals are used throughout the various views to designate like parts and, more particularly, to FIG. 1, according to this Figure a radial flow compressor is arranged at a motor vehicle gas turbine and supplies compressed air to a combustion chamber 12, illustrated in a longitudinal view for the sake of clarity. A heat exchanger (not shown) is usually connected therebetween but has been omitted from the drawings also for the sake of clarity.

The radial flow compressor 11 includes a casing 13 which houses a rotor 15 mounted on a shaft 14 and a diffusor 16 effective as a secondary set of guide vanes. The diffusor 16 includes a plurality of blades 17, with ducts 18 lying between the blades 17 or adjoining a blade 17 and terminating in a spiral-shaped collecting chamber 19. An annular space 20, formed from air deflecting jacket or shroud 21 and a flame pipe 22 of the combustion chamber 12, is in communication with the collecting chamber 19 of the radial flow compressor 11.

In a zone of end faces 23 of the combustion chamber 12, the annular space 20 passes over, after being deflected, into an annular duct 25 formed by the flame pipe 22 and a shaped component 24. The annular duct 25 terminates in the combustion chamber 12 by way of an annular slot 26. Air conveyed by the radial flow compressor enters the combustion chamber 12 through the annular slot 26 as primary air, and through openings 27 in the flame pipe 22 as secondary air.

An atomizer nozzle 28 for feeding fuel to the combustion chamber is arranged at the end face 23 of the combustion chamber 12 and extends into the annular duct 25. Fuel is fed to the atomizing nozzle 28 through a conduit 29. Atomizing air is supplied to the atomizer nozzle from the radial flow compressor by way of one duct 30 of the diffusor 16, which is connected through a conduit 31 to the atomizer nozzle 28. The arrows in FIG. 1 illustrate the direction of flow of the compressed air.

As shown most clearly in FIGS. 2-4, the diffusor 16 includes solid blades 17 which delimit the ducts 18 and hollow blades 32, 33 which delimit the duct 30. The solid blades 17 and hollow blades 32, 33 each have a triangular cross-sectional configuration and are arranged between annular shrouds 34. While the ducts 18 terminate in the collecting chamber 19, the duct 30 is connected by way of an intermediate section 35 to the conduit 31 leading to the atomizer nozzle 28.

To attain an effective atomization of the fuel, the atomizing air flowing through the conduit 31 to the atomizer nozzle 28 and exiting therefrom must exhibit a substantially higher pressure than the air entering the annular duct 25 from the collecting chamber 19. In order to achieve this substantial increase in pressure, an all around bleeding off of the boundary layer in the duct 30 is effected so that all flow resistances in the duct 30 are practically eliminated. Therefore, the pressure at the outlet of the duct 30 is higher than the pressure at the outlet of the ducts 18, reduced by flow resistance.

In order to achieve a boundary layer bleed-off, sections 36 of the annular shrouds 34 laterally defining the duct 30, and the sides 37 of the hollow blades 32, 33 facing the duct 30 are respectively provided with slots 38, 39. The slots 39 terminate in inner spaces 40 of the hollow blades 32, 33 which, through bores 41 in sections 36 of the annular shrouds 34, are in communication with adjoining collecting chambers 42. The slots 38 in the sections 36 of the annular shrouds 34 terminate directly in the collecting chambers 42. The collecting chambers 42 are, by way of conduits 43, in communication with a location of low pressure within the engine housing or with the atmosphere. Thereby, the boundary layer of the air flowing in the duct 30 is bled-off and exhausted through the conduit 43.

Alternatively, as shown in FIG. 5, a diffusor generally designated by the reference numeral 44 may be provided which includes solid blades 45 as well as three hollow blades 46, 47 and 48 arranged between two annular shrouds 49. The diffusor 44 differs from the diffusor 16 essentially in that, in addition to ducts 50, 51 located between the hollow blades 46, 48, all other ducts 52 are provided with a boundary layer bleed-off. For this purpose, all of the ducts 50, 51, 52 are provided with slots 53 in the annular shrouds 49. Moreover, in the ducts 50 and 51, slots 54 are provided in the hollow blades 46, 47, 48. The number of slots 53 and 54 provided in the duct 50 is greater than the number of slots provided in the duct 51.

A partition 55 is arranged in the central hollow blade 47 so as to divide the hollow interior portion of the blade 47 into two chambers 56, 57 so that it is possible to effect a separate bleed-off of the boundary layer from the ducts 50, 51 through the slots 53 and, with the use of bores 58, 59 as well as 60 and 61, respectively, through the slots 54. The remaining ducts 52 are also provided with a combined bleed-off.

Intermediate sections 62, connected to outlets of the ducts 50 and 51 and conduits 63, 64 leading to atomizer nozzles (not shown), feed the atomizing air from the ducts 50, 51 to the atomizer nozzles. By providing an all around bleed-off of the boundary layer in the ducts 50 and 51, attained with additional slots 54, the flow losses in the ducts 50, 51 are reduced to a substantially greater extent than in ducts 52 so that the pressures at the outlet of the ducts 50, 51 are correspondingly higher than at the outlet of the remaining ducts 52. Thus an effective atomization of the fuel is attained at the inlet to the combustion chamber.

The pressure in the duct 50 is higher than the pressure in the conduit 51 due to the more vigorous boundary layer bleed-off made possible by the larger number of slots 53, 54 in the duct 50. The separate bleed-off of ducts 50, 51 also makes it possible to additionally influence the pressures by allowing the exhaust lines of these ducts 50, 51 to terminate at points of differing pressures. Thus, for example, it is possible for an operating atomizing nozzle connected to the conduit 63 to operate at a higher pressure than a pilot nozzle connected to the conduit 64 for an idling of the gas turbine.

Figure 6:
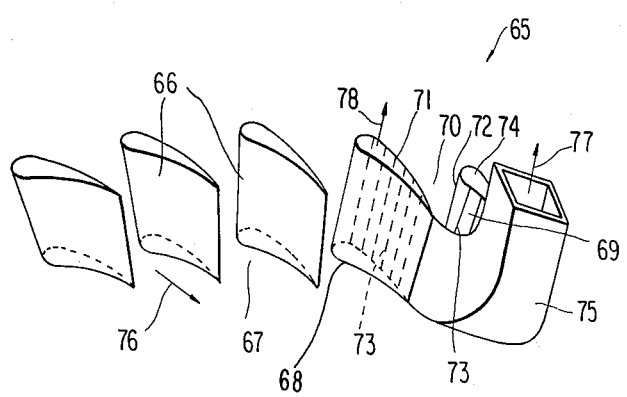
FIG. 6 is a perspective view of a portion of a secondary guide vane set of an axial-flow compressor for a gas turbine engine.

With an axial flow compressor, as shown in FIG. 6, a secondary guide vane set generally designated by the reference numeral 65 may include, in addition to solid blades 66 encompassing or defining ducts 67, two additional hollow blades 68, 69 which laterally delimit a duct 70. The blade 68 may be provided with slots 73 at an intake side 71 thereof and the blade 69 may be provided with slots 73 at a pressure side 72 thereof so as to permit the bleeding-off of the boundary layer into interior spaces 74 of the blades 68, 69, in communication with a point of low pressure. The duct 70 terminates in a receiving elbow 75 from which the air is supplied to an atomizer nozzle (not shown). The flow guidance in the secondary set of guide vanes 65 is indicated by the arows in such a way that the arrow 76 represents the compressor air fed to the combustion chamber, the arrow 77 represents the atomizer air, and the arrow 78 represents the exhausted air. By bleeding-off the boundary layer from the duct 70, the pressure of the atomizer air, as in the preceeding examples, is substantially higher than the pressure of the remaining compressor air.

As can readily be appreciated, the boundary layer may be bled-off by means of differently shaped apertures or by walls consisting of a porous material in lieu of the provision of slots.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A gas turbine which includes an air compressor means for supplying compressed air to a combustion chamber, at least one atomizer nozzle means for supplying fuel to the combustion chamber, the air compressor means includes a secondary guide vane set having a plurality of ducts, means are provided at at least one of said plurality of ducts for enabling a boundary layer bleed off, and in that means are provided for communicating said at least one duct of the secondary guide vane set with the atomizer nozzle means so as to enable a direct supplying of high pressure compressed air to said atomizer nozzle means, the secondary guide vane set includes a plurality of spaced solid blades and a pair of hollow blades defining said at least one duct, said blades being arranged between two annular shrouds, and in that means are provided for intensifying the bleed-off at said at least one duct, characterized in that said intensifying means includes a plurality of slots provided in said annular shrouds communicating with collecting chambers, and a plurality of further slots provided in said hollow blades and terminating in an interior space of the respective hollow blades, bore means are provided in the respective hollow blades for communicating the interior space with the collecting chambers, and in that means are provided for communicating the collecting chambers with a low pressure area of the gas turbine.

2. A gas turbine which includes an air compressor means for supplying compressed air to a combustion chamber, at least one atomizer nozzle means for supplying fuel to the combustion chamber, the air compressor means includes a secondary guide vane set having a plurality of ducts, means are provided at at least one of said plurality of ducts for enabling a boundary layer bleed off, and in that means are provided for communicating said at least one duct of the secondary guide vane set with the atomizer nozzle means so as to enable a direct supplying of high pressure compressed air to said atomizer nozzle means, the means for enabling a boundary layer bleed-off is provided at all of the ducts, means are provided for intensifying a boundary layer bleed-off of at least two of the ducts, said secondary guide vane set includes a plurality of spaced solid blades and at least three hollow blades spaced from each other so as to define said at least two ducts, and in that said blades are arranged between two annular shrouds, characterized in that said intensifying means includes a plurality of slots provided in said annular shrouds communicating with collecting chambers and a plurality of further slots provided in said hollow blades and terminating in an interior space of the respective hollow blades, bore means are provided in the respective hollow blades for communicating the interior space with the collecting chambers, and in that means are provided for communicating the collecting chambers with a low pressure area of the gas turbine.

3. A gas turbine according to claim 2, characterized in that the number of slots and further slots provided in one of said at least two ducts is greater than the number of slots and further slots provided in the other of said at least two ducts whereby it is possible for an atomizing nozzle means connected with the first of said two ducts to operate at a higher pressure than an atomizing nozzle means connected to the second of said two ducts.

4. A gas turbine according to one of claims 1 or 2, characterized in that each of the blades has a triangular configuration.

* * * * *